United States Patent
Hofmann et al.

(10) Patent No.: US 7,984,202 B2
(45) Date of Patent: Jul. 19, 2011

(54) DEVICE DIRECTED MEMORY BARRIERS

(75) Inventors: Richard Gerard Hofmann, Cary, NC (US); Jaya Prakash Ganasan, Youngsville, NC (US); Barry Joe Wolford, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 11/756,643

(22) Filed: Jun. 1, 2007

(65) Prior Publication Data
US 2008/0301342 A1 Dec. 4, 2008

(51) Int. Cl.
*G06F 13/28* (2006.01)
*G06F 13/48* (2006.01)
*G06F 13/00* (2006.01)

(52) U.S. Cl. ............. 710/22; 710/28; 710/110; 711/154
(58) Field of Classification Search ............... 710/22, 710/28, 110; 711/154
See application file for complete search history.

(56) References Cited

U.S. PATENT DOCUMENTS

| | | | |
|---|---|---|---|
| 6,996,812 B2* | 2/2006 | McKenney | 717/138 |
| 7,500,045 B2* | 3/2009 | Hofmann et al. | 710/311 |
| 2007/0214298 A1* | 9/2007 | Sullivan et al. | 710/110 |

FOREIGN PATENT DOCUMENTS

| | | | |
|---|---|---|---|
| WO | 9938085 | * | 7/1999 |
| WO | 2006102636 | * | 9/2006 |

OTHER PUBLICATIONS

International Search Report-PCT/US2008/065451, International Search Authority—European Patent Office—Sep. 26, 2008.
Written Opinion—PCT/US2008/065451, International Search Authority—European Patent Office—Sep. 26, 2008.

* cited by examiner

*Primary Examiner* — Chun-Kuan Lee
*Assistant Examiner* — Zachary K Huson
(74) *Attorney, Agent, or Firm* — Peter M. Kamarchik; Nicholas J. Pauley; Jonathan T. Velasco

(57) ABSTRACT

Efficient techniques for controlling synchronization of bus transactions to improve performance and reduce power requirements in a shared memory system are described. Interconnect arrangements in complex processing systems are also described that provide efficient data transfers between bus masters and shared memory devices to improve performance and reduce power use. In one example, a method for controlling synchronization of bus transactions to remote devices is addressed. A device directed memory barrier command is received. The device directed memory barrier command is decoded to determine one or more destination devices. A memory barrier command is selectively routed to the one or more destination devices in response to the decoding. The described techniques combine high speed device directed memory barrier capability, improved bus bandwidth functionality, and power saving features.

31 Claims, 7 Drawing Sheets

US 7,984,202 B2

DEVICE DIRECTED MEMORY BARRIERS

FIELD OF THE DISCLOSURE

The present disclosure relates generally to the field of memory consistency in processing systems, and more specifically, to improvements relating to memory barrier operations.

BACKGROUND

Many portable products, such as mobile phones, laptop computers, personal data assistants (PDAs) or the like, utilize a processor executing programs, such as, communication and multimedia programs. The processing system for such products includes a processor complex for processing instructions and data. The functional complexity of such portable products, other personal computers, and the like, require high performance processors and memory. At the same time, portable products have limited energy sources in the form of batteries and provide high performance operation at reduced power levels to increase battery life. Many personal computers being developed today also are being designed to provide high performance at low power drain to reduce overall energy consumption.

In order to guarantee correct operation and consistency of memory usage, a processor complex commonly enforces an ordering of operations on the use of memory which is shared by multiple processors, multiple program threads, multiple direct memory access (DMA) devices, or more generally by multiple bus masters. To control memory usage between multiple bus masters, a producer/consumer relationship may be defined between two or more processors or masters. In such a relationship, one processor or master that is writing data, or a "payload", to shared memory is referred to as the producer. The other processor or master that is to receive or operate on the written payload is referred to as the consumer. The payload may be a single data item or more complex, such as multiple information packets or frames of data, for example.

To maintain order between the multiple bus masters, a consumer may not access the payload until notified by the producer that the payload may be safely accessed. Such notification may occur by means of a software/hardware interrupt, a semaphore update, or a register write setting an access indication bit or bits. The consumer bus master may then safely begin reading the payload information just written and perform its processing of the payload. When the consumer has completed its processing, it may write a modified payload back to memory and, in the process, become a producer of the modified payload.

At the point a consumer is ready to read another payload from memory, it notifies the producer of its readiness to process a new payload via a software/hardware interrupt, semaphore update, or register write, for example. This ordered sequence can continue indefinitely. In this producer/consumer relationship it is important for an entire payload to be completely written to memory prior to signaling the consumer that it is available to be accessed. If the consumer is signaled before this occurs, the consumer may actually read "stale" payload data, or data from a preceding payload. Because of write buffering in interconnect arrangements and any bridging to memory, write data could be stored and present in intermediate stages even though the producer has a write completion indication on its master interface as received from a first buffer in the interconnect arrangement. Synchronization of bus transactions is not maintained in such a situation.

SUMMARY

The present disclosure recognizes that providing more efficient methods and apparatuses for controlling synchronization of bus transactions can improve performance and reduce power requirements in a processor system. It also recognizes that interconnect arrangements in complex processing systems need to be devised to provide efficient data transfers between processors and shared memory devices to improve performance and reduce power use. To such ends, an embodiment of the invention addresses a method for controlling synchronization of bus transactions to remote devices. A device directed memory barrier command is received. The device directed memory barrier command is decoded to determine one or more destination devices. A memory barrier command is selectively routed to the one or more destination devices in response to the decoding.

Another embodiment addresses a bus interconnect. The bus interconnect includes a controller configured to receive and identify a device directed memory barrier command. The bus interconnect also includes a decoder and path select unit that in response to the identified device directed memory barrier command selects remote devices based on information associated with the device directed memory barrier command and selectively routes a memory barrier command to the selected remote devices.

Another embodiment addresses a bus master method for controlling synchronization of bus transactions to remote devices. A device directed memory barrier command is issued to a bus interconnect to control synchronization of bus transactions to a selected remote device. A completion response is received from the bus interconnect, the completion response indicating completion of the device directed memory barrier command. In response to the completion response, notification is sent to a different bus master associated with the selected remote device.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
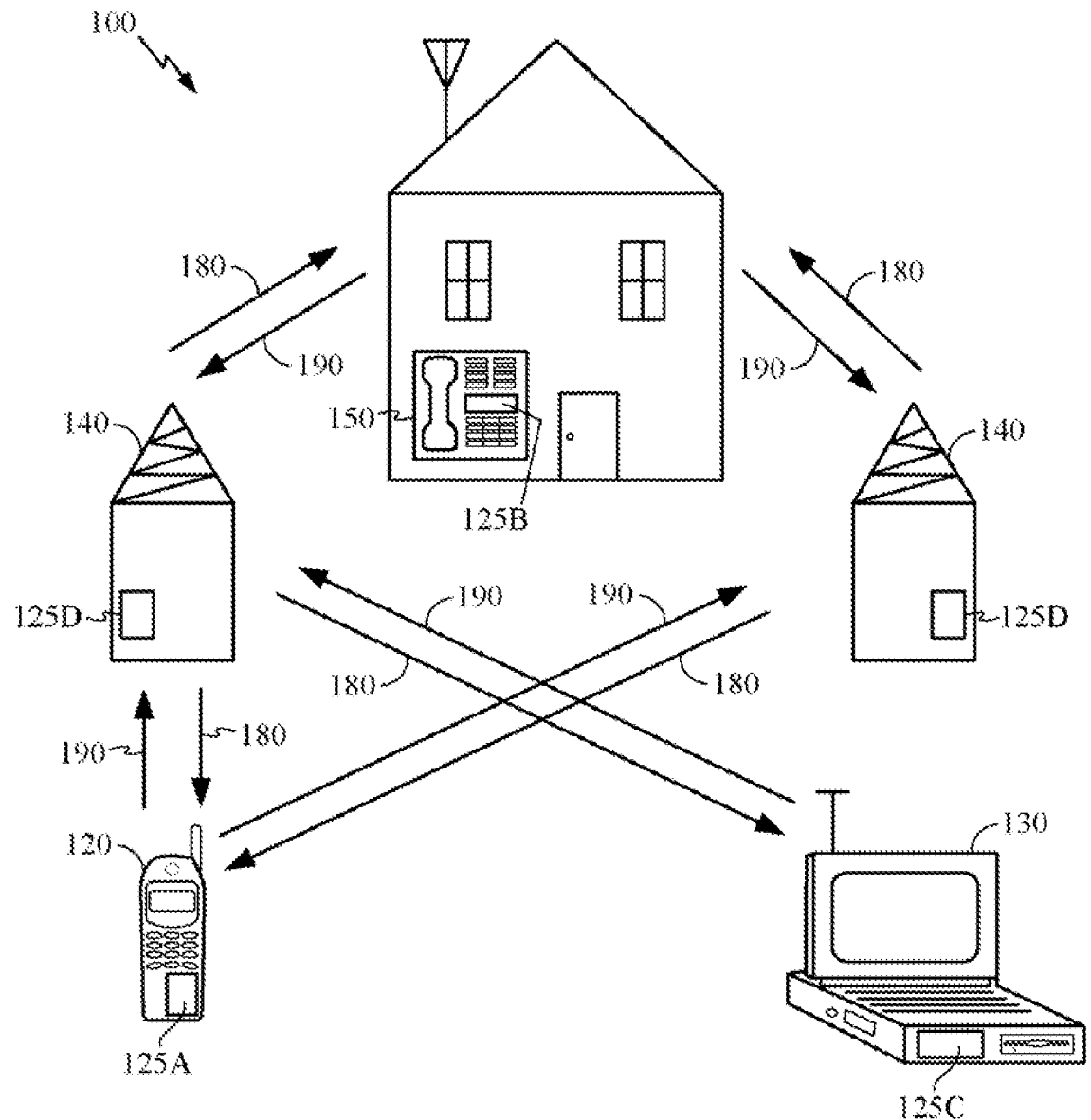
FIG. 1 illustrates a wireless communication system.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication system (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any device having a shared memory subsystem.

Figure 2:
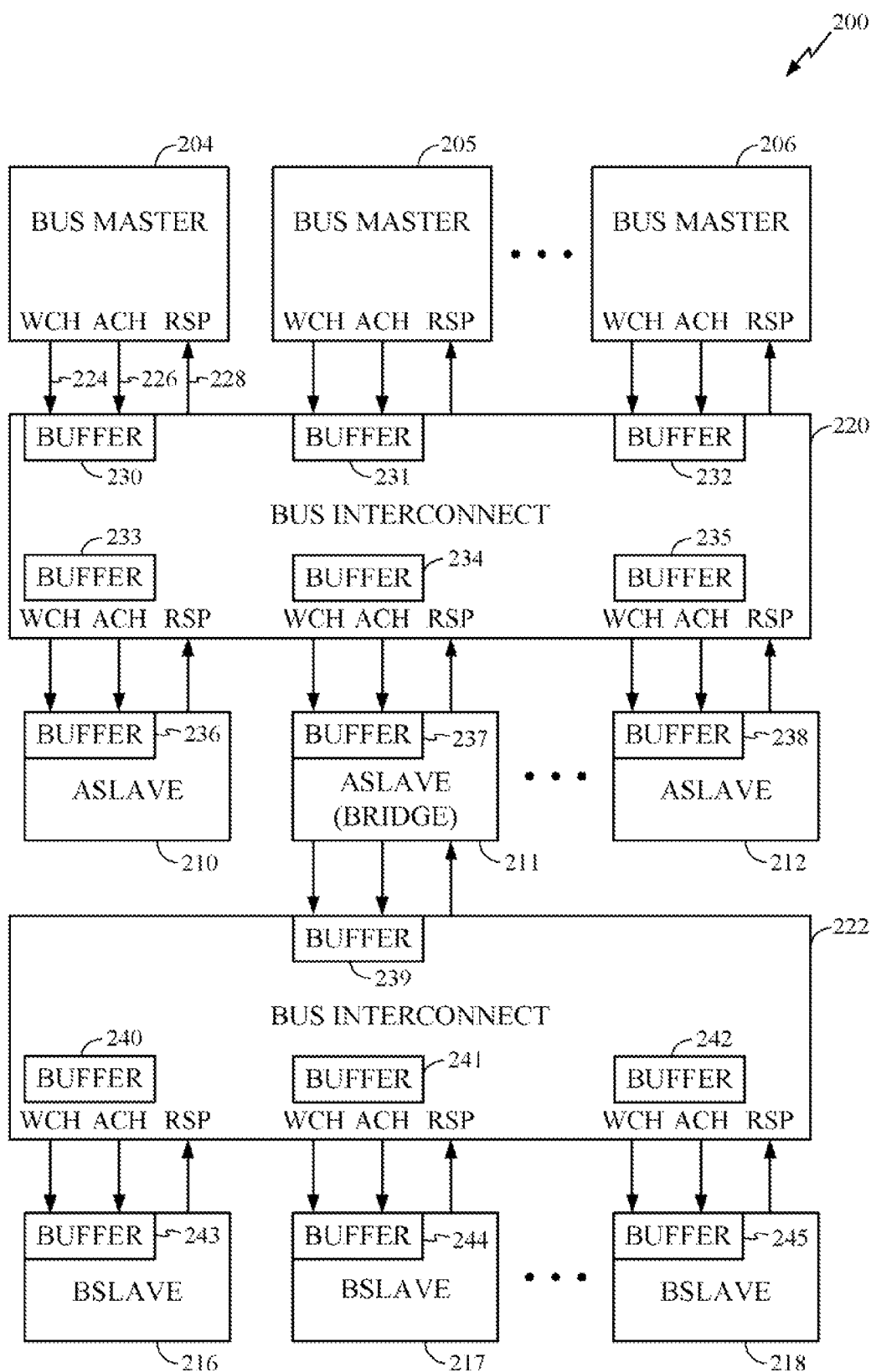
FIG. 2 is a processor complex with multiple bus masters, bus interconnects employing device directed memory barrier commands, and multiple slave devices.

FIG. 2 is an exemplary embodiment of a processor complex 200 which may suitably be employed in components 125A, 125C, 125B, and 125D of FIG. 1. The processor complex 200 includes bus masters 204-206, bus interconnects 220 and 222 employing device directed memory barrier commands, and slave devices 210-212 and 216-218. The bus masters 204-206 and slave devices 210-212 and 216-218 are coupled with each other through the bus interconnects 220 and 222. The actual number of bus masters, slave devices, and bus interconnects, if any, required for a particular application may vary depending upon processing requirements and design constraints. Each bus master may be a processor, a cluster of multiple processors, a digital signal processor, a threaded processor supporting multiple program threads, a direct memory access (DMA) controller, or the like.

A bus interconnect, such as bus interconnect 220, manages bus traffic and provides connection paths between one or more bus masters and the multiple slave devices. A slave device may be a memory controller, a bridge device for interconnecting to another bus interconnect device, such as bridge Aslave 211 and bus interconnect 222, a peripheral device such as a hard disk controller, a universal serial bus (USB) controller, an interactive display device, a radio device coupling a controller to a transmitter and receiver, or the like. A bus master, a bus interconnect device, and a slave device may be implemented using application specific integrated circuit (ASIC) technology, field programmable gate array (FPGA) technology, or other programmable logic, discrete gate or transistor logic, or any other available technology suitable for an intended application.

A processor, used within a bus master or a slave device, may be configured to execute instructions under control of a program stored on a storage medium either directly associated locally with the processor, such as may be available through an instruction cache, or accessible through a bus interconnect from a slave device. The bus masters also may process data residing in a memory device either directly associated locally with the processor, such as may be available through a data cache, or accessible through a bus interconnect from a slave device. The storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), compact disk (CD), digital video disk (DVD), other types of removable disks, or any other suitable storage medium.

The bus interconnects 220 and 222 are illustrated in a general form having separate write data, address, and read data busses and associated control signals. In many systems, a combined write and read data bus may be used. Generally, the separate address, read data, and write data channels conform to a particular bus architecture, or standard, depending upon the requirements of a particular system. For clarity of discussion of a write transmission path, a write channel (WCH) 224, an address channel (ACH) 226, and a response channel (RSP) 228, which propagates read, write, barrier, and the like responses, are described that allow for the communication of a transfer address, transfer attributes, a command, and write data from a source device to a destination device. It is noted that a separate write response channel may be advantageously used for improved system performance.

The transfer attributes may be a parameter that describes the nature of the transfer or provides additional information required by the transfer. For example, the transfer attributes describing a transfer may be associated with an address channel and may be used to identify a destination device or devices that are to receive the transfer. Alternatively, the transfer attributes may be transmitted using sideband signaling or included as part of a header in a data packet depending upon the architecture of the communication subsystem. It is further assumed though not limited to this arrangement that the bus interface to the slave devices adhere to the same or similar type of interface. These separate interfaces are typically buffered to support flow control and variation in bus traffic between multiple devices. In particular, the processor complex 200 illustrates buffers 230-245 for a write path from the bus masters 204-206 to any of the slave devices 210-212 and 216-218. It is appreciated that read data paths between the bus masters and slave devices are also implemented in a similar manner, but in an opposite direction.

The bus masters in such a processor complex 200 may at times require ordered transactions for read and write operations that go across the various busses between source and destination points. For purposes of illustration, an exemplary data transfer scenario is described in which bus master 204 is a processor that processes data prior to storing the data, Bslave 218 is a memory unit which is to receive the data, and bus master 205 is a hard disk controller which is to fetch the data stored in Bslave 218 for subsequent storage on a hard disk. The data transfer scenario can be viewed at a high level, where the bus master 204 sends a block of data to be stored in Bslave 218 and then directs the bus master 205 to retrieve the data from the Bslave 218 storage and save it to a hard disk. The scenario consists of transferring the block of data through buffers 230 and 234 in the bus interconnect 220, to buffer 237 in the bridge Aslave 211, to buffers 239 and 242 in bus interconnect 222, and to buffer 245 in Bslave 218. The Bslave 218 then stores the block of data in its memory. Once the block of data has been stored, an acknowledgement is sent back through the bus interconnect 222, to the bridge Aslave 211, to the bus interconnect 220, and to the bus master 204. The bus master 204 then informs the bus master 205 that the block of data is available to be fetched for storage on the hard disk. The bus master 205 fetches the data following a receive path through the two bus interconnects 220 and 222 and completes the store to disk operation. This type of operation sequence is referred to as a producer-consumer model, where the bus master 204 is the producer and the Bslave 218 is the consumer for the initial transfer of the block of data to the slave device.

In a complex system, with multiple bus masters storing and retrieving data from the memory Bslave 218, these transactions may take a relatively long time due to latency of arbitration for bus access and the transmission time across the buses. High performance processors may continue processing and be ready to send further data to the same device prior to an earlier operation completing. Holding up the bus master 204 until an acknowledgement is received, or requiring the bus master to keep track of the order of operations, can drastically decrease performance.

As indicated above, bus masters in a multi-processor system may at times require ordered transactions for reads and writes that go across the various system interconnect buses to a shared memory facility. Many of the read and write operations to memory require that the read and write transactions be completed in the same order they are initiated. It is noted that while this ordering relationship is maintained, running unrelated read and write transactions out of order may yield performance benefits. As a consequence, a weakly-ordered memory model may be used. The weakly-ordered memory model allows relaxation of, for example, write-to-read, read-to-read, and read-to-write program order, including read-to-own-write early. The weakly ordered memory model does not generally allow read-of-other's-write early.

This need for both ordered and unordered transactions has led some architectures to use a fence or memory barrier operation for forcing ordered transactions when needed. As used herein, a memory barrier is a general operation used to enforce order between transactions to shared memory. For example, two types of memory barriers are described. The first type is a data memory barrier (DMB) which simply creates a barrier between previous and subsequent memory accesses made by a bus master. The DMB ensures that all outstanding explicit memory accesses issued prior to the DMB are complete before any following memory transactions begin. The second type is a data synchronization barrier (DSB) which not only creates a barrier but also forces context synchronization. The DSB operates in a manner similar to the DMB with an additional requirement that no memory accesses issued after the DSB are executed until the DSB is completed. For example, all cache, branch predictor, and translation look-aside buffer (TLB) maintenance instructions are commonly not executed before the DSB is complete.

In a producer-consumer relationship, a data transfer operation initiated by a producer bus master should be completed prior to signaling the consumer, a different bus master, that the data has been transferred and is now available. If such a requirement is not followed, write data could be stored and present in intermediate stages within an interconnect subsystem, such as in buffers 230-245, even though the producer has a write completion indication on its master interface.

A conventional approach to address such a problem, uses a producer to send a data synchronization barrier (DSB) to the bus interconnect after it has written the entire payload and prior to signaling the consumer. In this manner, all preceding transactions from this master are forced to completion. Once the barrier operation completes, the producer notifies the consumer that the payload is guaranteed to be written. A drawback to this conventional approach is that the bus interconnect generally is required to interpret a barrier operation from a bus master as an indication to broadcast the barrier command to all slaves that the bus master has access to. To accomplish this broadcast of the barrier command, the bus interface to each of the slaves is arbitrated, the barrier command is broadcast to the slaves, and then the bus interconnect waits for responses from the slaves that received the broadcast barrier command. Upon receiving all the responses from each of the slaves, a completion response may be returned to the bus master that originated the barrier command. Since the producer may have access to many slaves and a slave may be a bridge to another bus interconnect having additional slaves, the process of arbitrating for each slave and waiting for responses from each of the slaves may be very time consuming. It is realized that this approach can cause loss of performance and increased power consumption.

To resolve such problems, an advantageous device directed memory barrier command is used that provides device information associated with the payload data being sent to the bus interconnect. The device information may take the form of an address, such as a number of high order address bits representing an address range corresponding to a device or devices. The device information may also take the form of selection bits identifying a device by a particular bit position. These device directed memory barrier commands provide device specific information on a signaling path, such as, an address bus or sideband signal paths. For example, an address directed memory barrier command may be sent from a bus master using an address channel, such as address channel ACH 226, to provide attributes of the bus command and an address. A unique encoding of the address directed memory barrier command allows its identification in the bus interconnect and any attached device receiving such a command.

The bus interconnect decodes the address directed memory barrier command and utilizes selected high order address bits from the address bus to determine which slave is being addressed for the associated payload data. The address directed memory barrier command may specify that a single slave is associated with the payload data. Since the slave devices are generally assigned a unique address range, an address decoding and bus steering function may be included in the bus interconnect to support normal read and write data transfers and extended to support the device directed memory barrier command. The address directed memory barrier command controls synchronization to the addressed slave device or devices. In one embodiment, a device directed command results in generating a DSB that is selectively routed to a targeted slave or slave devices and not generally distributed to other devices. The targeted slave device or slave devices receiving the DSB do not have to be modified to support the device directed commands. The device directed memory barrier command also advantageously reduces the number of broadcast operations required to control synchronization of bus transactions, which saves both power and bandwidth on the system buses.

Figure 3:
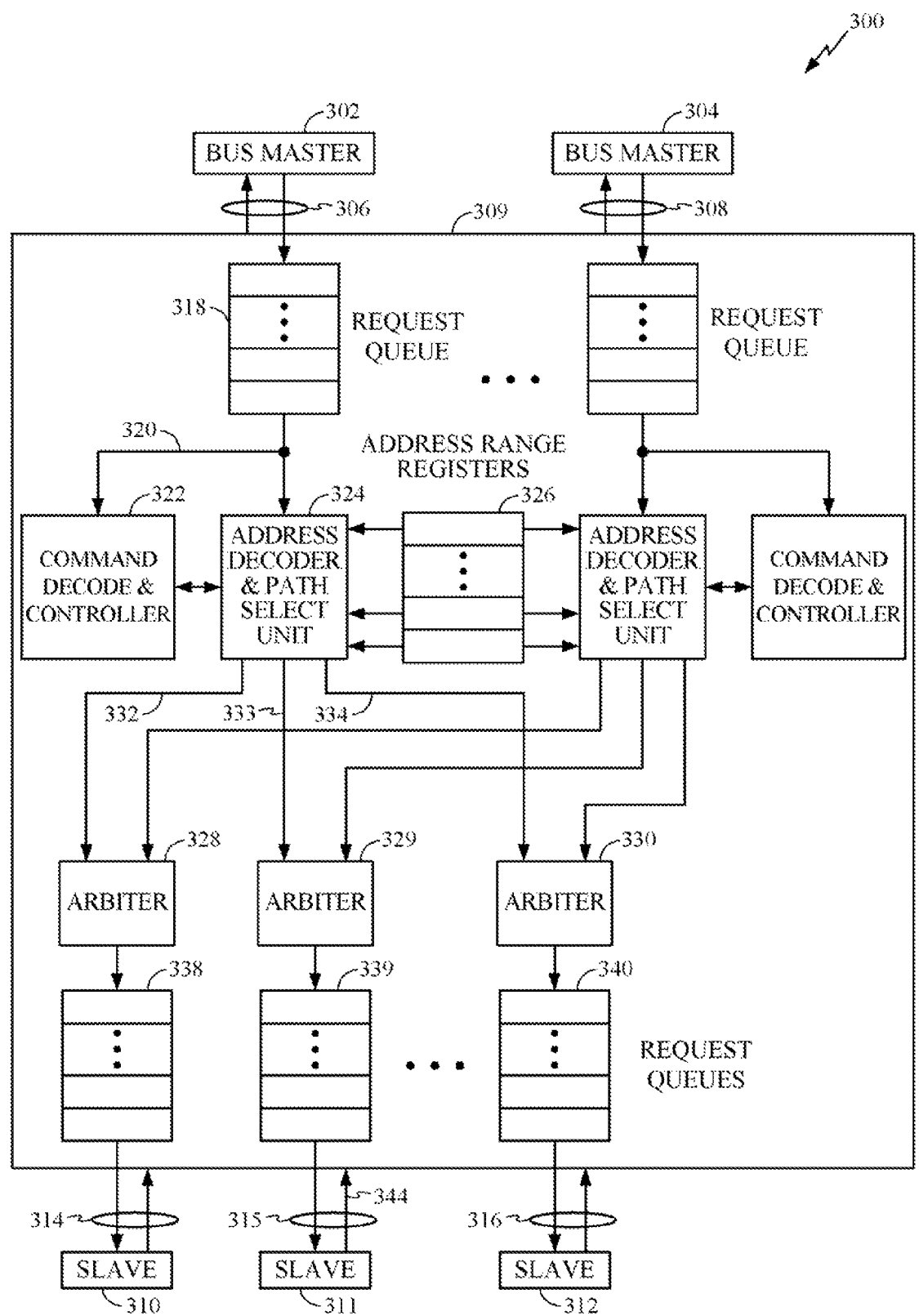
FIG. 3 is an interconnect system for interpreting and responding to an address directed memory barrier command.

FIG. 3 is an exemplary embodiment of an interconnect system 300 for interpreting and responding to an address directed memory barrier command. The interconnect system 300 illustrates two bus masters 302 and 304 with bus master interfaces 306 and 308, a bus interconnect 309, and a plurality of slave devices 310-312 with slave interfaces 314-316. While two bus masters and three slave devices are shown, it is appreciated that the actual number of bus masters and slave devices required for a particular application may vary depending upon processing requirements and design constraints.

In an exemplary operation scenario, the bus master 302 issues a request to the bus interconnect 309 to transfer a data packet to the slave device 311 with an address directed memory barrier command. The address directed memory barrier (ADB) command is received from the bus master interface 306 into a request queue 318. The ADB command when selected is made available on internal request bus 320 and received in a command decoder and controller 322. The ADB command is decoded in the command decoder and controller 322 which enables address decoder and path select unit 324 to select the appropriate address range associated with the data packet bus request from address range registers 326. The address range registers are programmed for the memory regions associated with each slave device, such as slave devices 310-312. An address range value associated with a transaction to a slave device is compared to the address supplied by the ADB command, as described in further detail below.

Based on the destination slave device or devices, the transaction request is passed to one or more of the arbiters 328-330 over internal paths 332-334. In the example scenario, the transaction request is passed to arbiter 329 over internal path 333. The arbiters 328-330 are associated with multiple bus masters, such as bus master 302 and 304 and arbitrate the bus masters for access rights to a slave device. The arbiters 328-330 are connected to request queues 338-340, respectively. Once the request is arbitrated, a barrier request is passed to the request queue 339 and from there to the destination slave device 311 over the slave interface 315.

The command decoder and controller 322 decodes the address directed memory barrier (ADB) command and generates a data synchronization barrier (DSB) command for transfer to specified slave devices. For example, the ADB command, segment directed memory barrier (SDB) command described in more detail below, and data synchronization barrier (DSB) commands may employ an exemplary encoding of various commands as shown in TABLE 1 below:

TABLE 1

| Command | Encoding | | |
|---|---|---|---|
| | A | B | C |
| Data Synchronization Barrier (DSB) | 1 | 0 | 0 |
| Address Directed Memory Barrier (ADB) | 1 | 1 | 1 |
| Segment Directed Memory Barrier (SDB) | 1 | 0 | 1 |
| Reserved | 1 | 1 | 0 |

The encoding of Table 1 may be decoded and interpreted in the bus interconnect 309 to identify different types of memory barrier commands. The encoding may be passed through the bus interconnect 309 to a slave device which may decode and interpret the encodings as "1xx" indicating a data synchronization barrier (DSB) command. This technique or other such encoding technique may be also used to encode the data memory barrier command.

The command decoder and controller 322 supplies the DSB command to a number of the arbiters 328-330. Based on the address directed memory barrier command and the selected address range of the example scenario, arbiter 329 grants the bus master's 302 request and the DSB command is posted to the request queue 339. When selected from the request queue 339, the DSB command is passed across slave interface 315 to the slave device 311.

The slave device 311 acknowledges receipt of the DSB command by a return acknowledgment on a response channel after it can guarantee the ordering requirement of the DSB is met, such as indicated by return signal path 344. The bus interconnect 309 passes the return acknowledgement to the bus master 302 over bus master interface 306. If memory barrier commands are selectively routed to multiple slave devices, as described further below, the acknowledgements from all of the slave devices are collected first before responding back to the requesting bus master.

Figure 4:
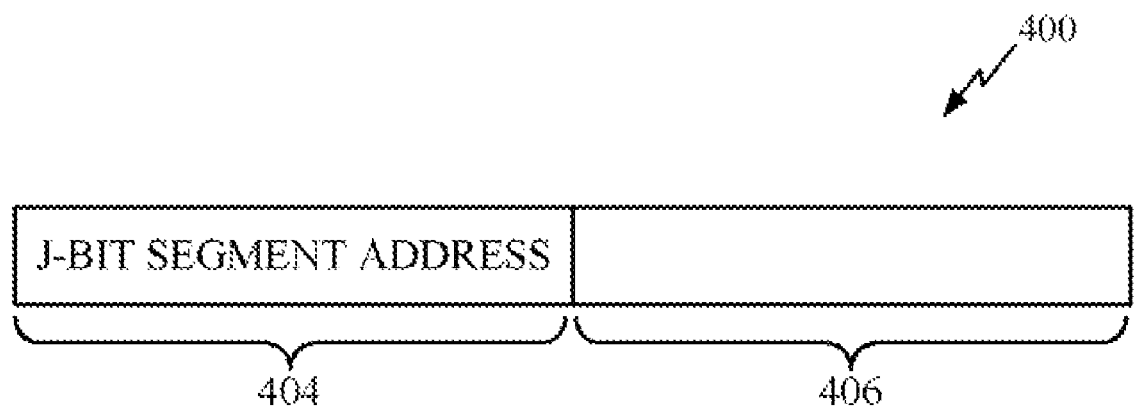
FIG. 4 illustrates an exemplary address format of an address attribute used in conjunction with an address directed memory barrier command.

FIG. 4 illustrates an exemplary address format 400 of an address attribute used in conjunction with an address directed memory barrier command. Information provided on an address channel, such as ACH 226 of FIG. 2, having, for example, a 32-bit width, may be divided into a J-bit segment address field 404 and a reserved field 406. The J-bit segment address field 404 contains the high order bits of addresses to which a slave device responds. For example, the parameter "J" may contain 16-bits which are the high order 16-bits of a 32-bit address. Each of the slave devices are mapped to a specific range of addresses in the system address space thereby segmenting the system address space. Depending on the function of a slave device, a large address range may be assigned to the slave device or multiple separate address ranges may be assigned. For example, if a slave device is a storage device, a large address range may be specified. A slave device with multiple functions may be assigned multiple separate address ranges. Based on the segmented address mappings, a value for J may be chosen such that individual slave devices or multiple slave devices may be identified by a specific J-bit segment address value.

Figure 5:
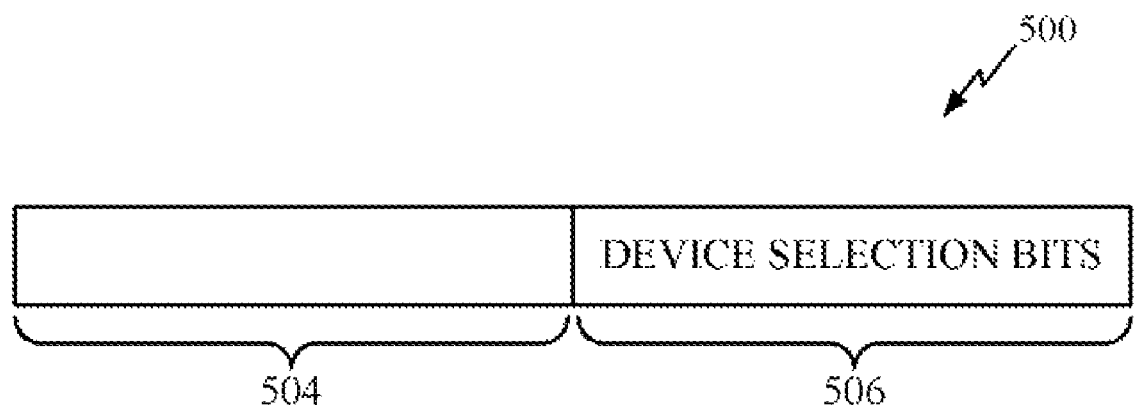
FIG. 5 shows an exemplary device selector format of a segment attribute used in conjunction with a segment directed memory barrier command.

FIG. 5 shows an exemplary device selector format 500 of a segment attribute used in conjunction with a segment directed memory barrier command. An address channel, such as ACH 226 of FIG. 1, having, for example, a 32-bit width, may provide information on the channel that is divided into a reserved field 504 and device selection bits 506. Alternatively, device selection bits 506 may be provided on sideband signaling paths. Device selection bits 506 allow slave devices to be identified that are to receive a memory barrier command. For example, with 16 device selection bits, 16 slave devices may be enabled singly. For example, the slave device 311 of FIG. 3 may be specified to correspond to one of the device selection bits 506 which may then be used to indicate, for the purposes of the segment directed memory barrier command, whether or not the slave device 311 is to receive a barrier command. Various combinations of slave devices may be enabled by use of device selection bits 506.

For a system such as the processor complex 200 of FIG. 2, a hierarchical arrangement of slave devices may be specified using an address format 400 or a device selector format 500 to identify slave devices on a first level interconnect, such as slave devices 210-212, and separately identify slave devices on a second level interconnect, such as slave devices 216-218. For example, using the address format 400, the J-bit segment address field 404 may be specified for a first level interconnect with "J" equal to 16-bits allowing the reserved field 406, also of 16-bits, to be used to specify a second segment address field for a second level interconnect. In a similar manner, the device selector format 500 may be split into two segments each separately specifying device selection bits for a two level interconnect hierarchy. It is also noted that a two level hierarchy may use a combined approach. For example, the first level interconnect may use a J-bit segment address field 404 in a first partition of an address format and the second level interconnect use device selection bits in the reserved field 406.

In systems having a large number of slave devices at one or more hierarchical levels, an alternate embodiment may include a device selector register within a bus interconnect 220 or bridge slave device 211. For example, with both an address channel of 32-bit width and a device selector register also of 32-bit width in each bridge interconnect path, 32 slave devices may be identified on each level of a multiple level hierarchical system. Alternative bus and device selector register widths may be chosen appropriate to the system configuration. The bits in the device selector register may be loaded with standard load or copy mechanisms, such as by use of an immediate load instruction, for example.

Figure 6:
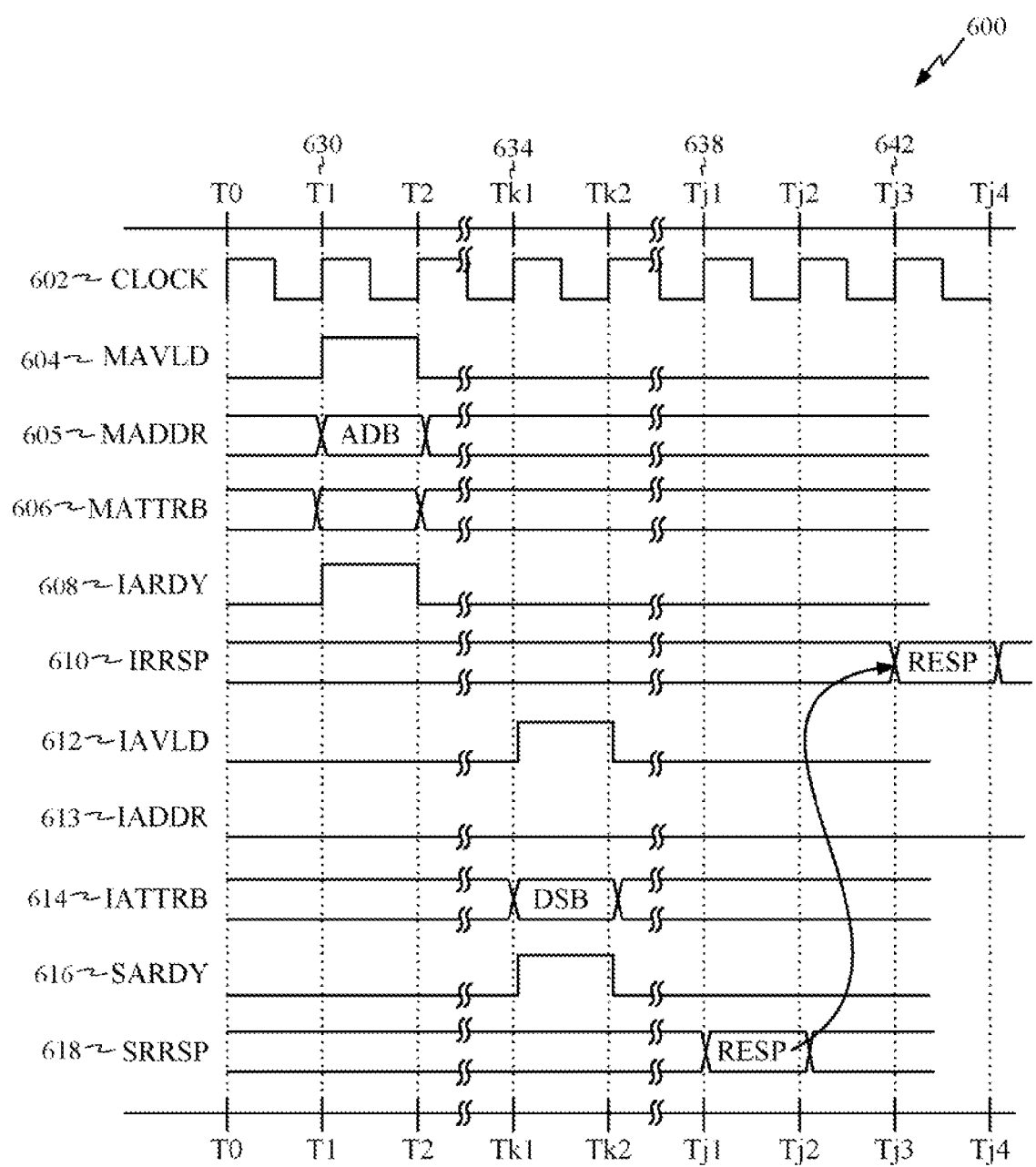
FIG. 6 shows a timing diagram illustrating a sequence of timing events in the issuance of a device directed memory barrier command for acceptance of device information from an address channel, such as provided by the address format 400 of FIG. 4 or the device selector format 500 of FIG. 5.

FIG. 6 shows a timing diagram 600 illustrating a sequence of timing events in the issuance of a device directed memory barrier command for acceptance of device information from an address channel, such as provided by the address format 400 of FIG. 4 or the device selector format 500 of FIG. 5. Exemplary relationships between the timing events of FIG. 6 and the elements of FIG. 3 are indicated by referring to exemplary elements from the interconnect system 300 which may suitably be employed to carry out the timing events of FIG. 6.

The timing diagram 600 illustrates signals and timing events for bus transactions from the bus master 302 with a device directed memory barrier command to the slave device 311. The signals include a system provided clock 602 and bus master 302 signals master address valid signal (MAVLD) 604, master address channel (MADDR) 605, and master attributes (MATTRB) signal 606. The bus interconnect 309 provided signals include interconnect address ready (IARDY) signal 608, bus interconnect read response (IRRSP) signal 610, interconnect address valid (IAVLD) signal 612, interconnect address channel (IADDR) 613, and interconnect attributes (IATTRB) signal 614. The slave device 311 provided signals include slave address ready (SARDY) signal 616 and slave read response (SRRSP) signal 618. The clock 602 provides a timing reference for the other signals.

A first bus transaction begins with the bus master 302 initiating a device directed memory barrier command transfer to slave device 311. At time T1 630, the master asserts master address valid (MAVLD) signal 604, and provides master attributes (ADB) values, such as the address format 400 of FIG. 4 or the device selector format 500 of FIG. 5, on the address channel as part of the device directed memory barrier command. In response, the bus interconnect 309 issues IARDY signal 608 and accepts the request, the master provided attributes (MATTRB) signal 606, and address or device selection bits from the address channel MADDR 605. The MATTRB signal 606 includes an indication of the type of device directed memory barrier command.

The bus interconnect 309 arbitrates for the destination path and writes the DSB request to the request queue 339. At time Tk1 634, when the bus interconnect 309 is ready, the bus interconnect 309 asserts interconnect address valid (IAVLD) signal 612 and provides the interconnect attributes (IATTRB) values to specify a data synchronization barrier (DSB). It is noted that for a DSB request to slave devices, the interconnect address channel IADDR 613 is not used on the interface to the slave devices. In response, the slave device 311 asserts SARDY signal 616 and accepts the request and the bus interconnect 309 provided attributes (IATTRB) signal 614 from the interconnect address channel. The IATTRB signal 614 includes the DSB command indication which does not require address information for proper operation because it is a slave end point. At time Tk2 638, the bus interconnect 309 then receives a read response from the slave device 311 as indicated by the slave read response (SRRSP) signal 618. While the SRRSP signal 618 is simply illustrated, it is noted that read valid and read ready signals would be used in the read response transfer. At time Tj3 642, which may be one or more cycles later to account for internal processing of the bus interconnect, IRRSP signal 610 is asserted to the bus master to indicate the ordering operating has completed.

Figure 7:
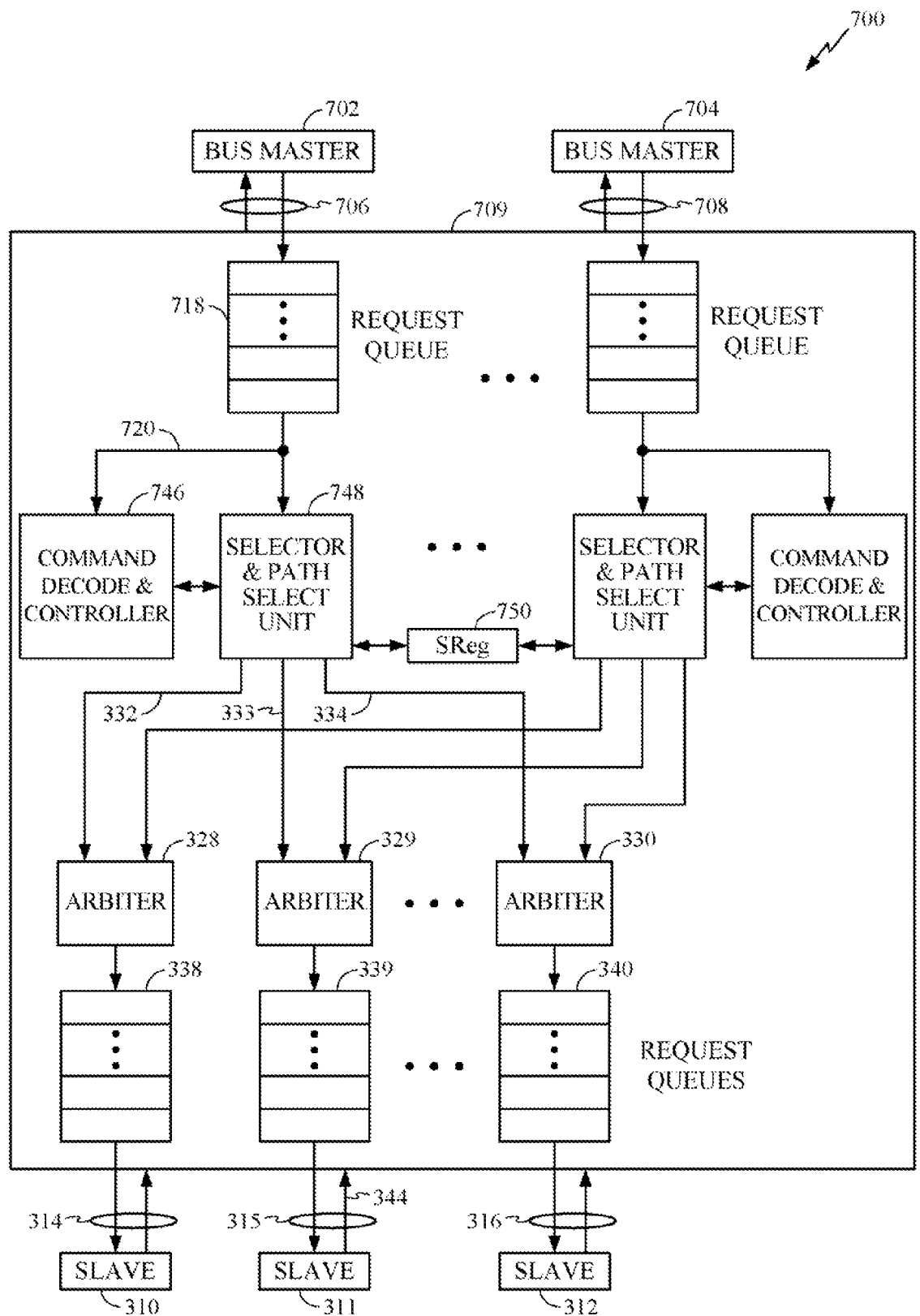
FIG. 7 illustrates an interconnect system for interpreting and responding to a segment directed memory barrier command.

FIG. 7 illustrates an interconnect system 700 for interpreting and responding to a segment directed memory barrier command. The interconnect system 700 illustrates two bus masters 702 and 704 with bus master interfaces 706 and 708, a bus interconnect 709, and a plurality of slave devices 310-312 with slave interfaces 314-316. While two bus masters and three slave devices are shown, it is appreciated that the actual number of bus masters and slave devices required for a particular application may vary depending upon processing requirements and design constraints.

In an exemplary operation scenario, the bus master 702 issues a request to the bus interconnect 709 to transfer a segment directed memory barrier command to slave device 311. The segment directed memory barrier (SDB) command is received from the bus master interface 706 into a request queue 718. The SDB command when selected is made available on internal request bus 720 and received in a command decoder and controller 746. The SDB command is decoded in the command decoder and controller 746 which enables selector and path select unit 748 to use specified bits in a segment attribute, such as device selection bits 506 of FIG. 5 associated with the segment directed memory barrier command, to determine selected remote devices.

Based on the selected remote slave device or devices, the transaction request is passed to one or more of the arbiters 328-330 over internal paths 332-334. In the example scenario, the transaction request is passed to arbiter 329 over internal path 333. The arbiters 328-330 are associated with multiple bus masters, such as bus masters 702 and 704 and arbitrate the bus masters for access rights to a slave device. The arbiters 328-330 are connected to request queues 338-340, respectively. Once the request is arbitrated, a barrier request is passed to the request queue 339 and from there to the destination slave device 311 over the slave interface 315. The command decoder and controller 746 decodes the segment directed memory barrier command and generates a data synchronization barrier (DSB) instruction for transfer to specified slave devices.

The command decoder and controller 746 supplies the DSB command to a number of the arbiters 328-330. Based on the segment directed memory barrier command and the selected remote devices of the example scenario, arbiter 329 grants the bus master's 702 request and the DSB command is posted to the request queue 339. When selected from the request queue 339, the DSB command is passed across slave interface 315 to the slave device 311.

The slave device 311 acknowledges receipt of the DSB command by a return acknowledgment on a response channel, such as indicated by return signal path 344. The bus interconnect 309 passes the return acknowledgement to the bus master 702 over bus master interface 706. If memory barrier commands are sent to multiple slave devices based on the segment select fields, the acknowledgements from the selected slaves are collected first before responding back to the requesting bus master.

For a system such as the processor complex 200 of FIG. 2, a hierarchical arrangement of slave devices may be specified using a device selector format 500 to identify slave devices on a first level interconnect, such as slave devices 210-212, and slave devices on a second level interconnect, such as slave devices 216-218. Depending upon the bus width of the address channel in a particular system and the number of slave devices on each hierarchical level, such a hierarchical specification within a single format may not be possible. In such a case, a device selector register, such as a selector register 750, may be specified within the bus interconnect 709 or bridge slave device 211 of FIG. 2, for example. With both an address channel of 32-bit width and a selector register 750 also of 32-bit width in each bridge interconnect path, thirty-two slave devices may be identified on each level of a multiple level hierarchical system. The bits in the selector register 750 may be loaded with standard load or copy mechanisms, such as by use of an immediate load instruction.

Figure 8:
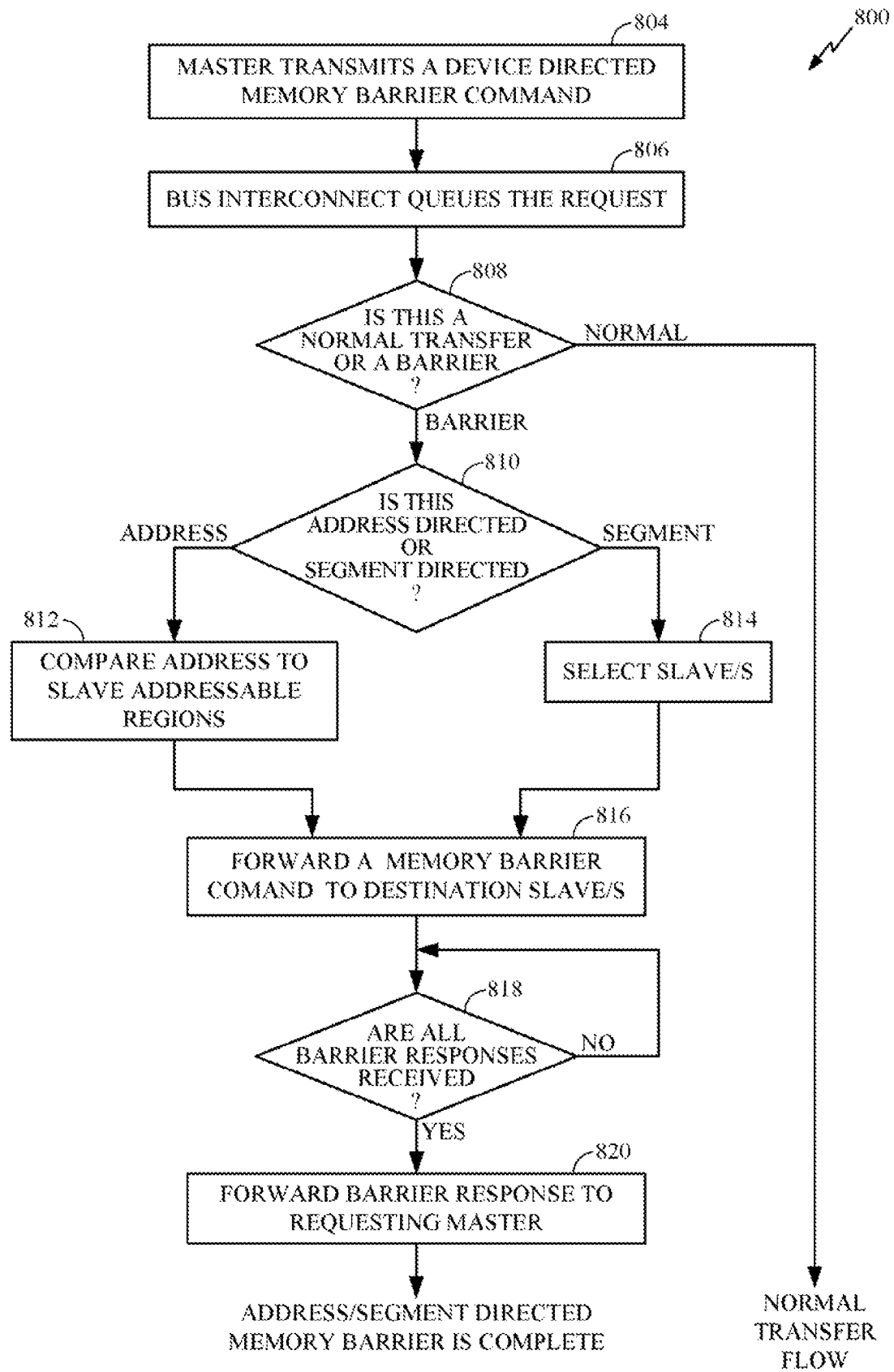
FIG. 8 illustrates a flow diagram of a sequence of events in a bus interconnect responding to a device directed memory barrier command.

FIG. 8 illustrates a flow diagram 800 of a sequence of events in a bus interconnect responding to a device directed memory barrier command. Exemplary relationships between the blocks of FIG. 8 and the elements of FIG. 3 and FIG. 7 are indicated by referring to exemplary elements from the interconnect systems 300 and 700, respectively, which may suitably be employed to carry out the sequence of events of FIG. 8.

Beginning at block 804, bus master 302 transmits a device directed memory barrier command to bus interconnect 309. At block 806, the bus interconnect 309 queues the request in request queue 318. At decision block 808, the bus interconnect 309 determines whether the transfer request is a normal transfer or a barrier command. If the request is for a normal transfer, a normal transfer flow is followed. If the request is a barrier command then decision block 810 is reached. At decision block 810, the bus interconnect determines whether the barrier is an address directed memory barrier or a segment directed memory barrier.

If the request is an address directed memory barrier then block 812 is reached. At block 812, the address provided on the address channel from the bus master is compared in the address decoder and path select unit 324 to the available slave addressable regions provided from the address range registers 326. Those slave devices having a matching slave addressable region are selected as destination slave devices. If the request is a segment directed memory barrier then block 814 is reached. At block 814, the slave devices as indicated in a device selector format 500 of FIG. 5 are selected in selector and path select unit 748 as destination slave devices. At block 816, a memory barrier command is forwarded to the selected destination slave device or devices. At decision block 818, the bus interconnect 309 waits pending receipt of all barrier responses. Once all barrier responses have been received, then block 820 is reached. At block 820, a barrier response is forwarded to the requesting bus master, which in this scenario is bus master 302. At this point the address/segment directed memory barrier operation is complete.

A conventional strongly ordered memory access provides another mechanism for controlling or enforcing program order on a sequence of data transfer requests from a master to a slave device. A conventional strongly ordered memory access may be viewed as a non-cacheable access and the access location possibly shared. A conventional strongly ordered memory access operates as if the access was protected by a fence, such as obtained through the use of a data memory barrier command. The access type may be provided on a separate set of signals indicating whether the access to an attached device is a strongly ordered memory access. A bus interconnect receiving an indication of a conventional strongly ordered memory access broadcasts a data memory barrier command to all slave devices that may be accessed by the bus master that initiated the strongly ordered memory access, except for the target slave device. After all slave devices that received the DMB have acknowledged completion of the DMB, the interconnect device issues the strongly ordered access to the target slave device.

By use of a segment directed strongly ordered memory operation, as uniquely identified in a device selector format, such as, device selector format 500 of FIG. 5, for example, the interconnect device is informed of the targeted slave device or devices and advantageously does not broadcast a DMB. The strongly ordered access may proceed directly to the targeted slave device or devices. Since the address channel is required for the strongly ordered access, sideband signals may provide signal paths for device selection register bits used to identify the targeted slave devices.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of illustrative embodiments for instruction caches, data caches, and other types of caches, it will be recognized that a wide variety of implementations may be employed by persons of ordinary skill in the art consistent with the above discussion and the claims which follow below.

What is claimed is:

1. A method for controlling synchronization of bus transactions to remote devices comprising:
   receiving in a bus interconnect a device directed memory barrier command issued from a bus master, the device directed memory barrier command having an identification of a destination device selected from a plurality of destination devices accessible by the bus master;
   decoding the device directed memory barrier command and the identification to determine the selected destination device; and
   selectively routing a memory barrier command to the selected destination device in response to the decoding.

2. The method of claim 1 wherein the identification comprises:
   an address value identifying an address range to which the selected destination device responds, the address value provided on an address channel.

3. The method of claim 1 wherein the identification comprises:
   an attribute containing device selection bits to identify the selected destination device, the attribute provided on an address channel.

4. The method of claim 1 further comprising:
   determining that the device directed memory barrier command is an address directed memory barrier command; and
   comparing an address attribute with device address ranges to determine the selected destination device.

5. The method of claim 1 further comprising:
   determining that the device directed memory barrier command is a segment directed memory barrier command; and
   using specified bits in a segment attribute to determine the selected destination device.

6. The method of claim 1 further comprising:
   loading a segment register in a bus interconnect with specified bits corresponding to the selected destination device.

7. The method of claim 1 further comprising:
   determining that the device directed memory barrier command is a segment directed memory barrier command directed for remote devices on a second level of hierarchically connected remote devices; and
   using a segment identification to determine the second level of hierarchically connected remote devices and the selected destination device connected at the second level.

8. The method of claim 1 further comprising:
   collecting a response from the selected destination device, said responses indicating the completion of the memory barrier command; and
   sending a completion response indicating completion of the device directed memory barrier command.

9. A bus interconnect comprising:
   a controller configured to receive a device directed memory barrier command issued from a bus master and to identify the device directed memory barrier command having information on type of memory barrier command and selection of remote devices; and
   a decoder and path select unit in response to the identified device directed memory barrier command selects a remote device from a plurality of remote devices accessible by the bus master based on the information and selectively routes a memory barrier command to the selected remote device.

10. The bus interconnect of claim 9 wherein the information associated with the device directed memory barrier command comprises:
    an indication that the device directed memory barrier command is an address directed memory barrier command; and
    an address value received on an address channel and formatted to identify address ranges that selected remote devices respond to.

11. The bus interconnect of claim 9 wherein the information associated with the device directed memory barrier command comprises:
    an indication that the device directed memory barrier command is a segment directed memory barrier command; and
    a segment attribute containing device selection bits to identify selected remote devices, the segment attribute received on an address channel.

12. The bus interconnect of claim 10 further comprises:
    a plurality of address range registers; and
    a comparator for comparing the address value with an address selected from one of the plurality of address range registers to determine the selected remote device.

13. The bus interconnect of claim 11 further comprises:
    a selector for using specified bits in the segment attribute to identify the selected remote device.

14. The bus interconnect of claim 9 further comprises:
    a selector register for storing a specified bit in a second level segment attribute to identify the selected remote device attached at a second hierarchical level of interconnected remote devices.

15. A bus master method for controlling synchronization of bus transactions to remote devices comprising:
    issuing from a first bus master a device directed memory barrier command having an identification of a selected remote device to a bus interconnect to control synchronization of bus transactions to the selected remote device, wherein the selected remote device is selected from a plurality of remote devices accessible by the first bus master;
    receiving a completion response in the first bus master from the bus interconnect, the completion response indicating completion of the device directed memory barrier command; and
    sending, in response to the completion response, notification to a different bus master associated with the selected remote device.

16. The bus master method of claim 15 wherein the identification comprises:
    an address value formatted to identify address ranges to which the selected remote device responds, the address value provided on an address channel, wherein the identification further includes an indication of a level in a multilevel hierarchy of devices where the selected remote device is attached.

17. The bus master method of claim 15 wherein the identification comprises:
    a segment attribute containing device selection bits to identify the selected remote device, the segment attribute provided on an address channel, wherein the identification further includes an indication of a level in a multilevel hierarchy of devices where the selected remote device is attached.

18. The bus master method of claim 15 wherein the device directed memory barrier command comprises:
   an indication that a segment directed strongly ordered memory operation is in progress to the selected remote device; and
   an indication on sideband signals of a segment attribute containing device selection bits to identify the selected remote device.

19. The bus master method of claim 15 further comprising:
   loading a segment register in the bus interconnect with a bit corresponding to the selected remote device attached at a second hierarchical level of remote devices.

20. A method for controlling synchronization of bus transactions to remote devices comprising:
   issuing a device directed memory barrier command from a bus master;
   receiving in a bus interconnect circuit the device directed memory barrier command issued from the bus master, the device directed memory barrier command having an identification attribute that identifies a level interconnect in a multilevel interconnect hierarchy of destination devices and a plurality of destination devices accessible by the bus master and associated with the identified level interconnect;
   decoding the device directed memory barrier command and the identification attribute to select a destination device from the plurality of destination devices; and
   selectively routing a memory barrier command to the selected destination device according to the identified level interconnect in response to the decoding.

21. The method of claim 20, wherein the device directed memory barrier command is encoded as an address directed memory barrier (ADB) command that enables the bus interconnect circuit to interpret the identification attribute as having a first address range in a first section and a second address range in a second section.

22. The method of claim 20, wherein destination devices responsive to the first address range are on a first level interconnect of the multilevel interconnect hierarchy of destination devices and destination devices responsive to the second address range are on a second level interconnect of the multilevel interconnect hierarchy of destination devices.

23. The method of claim 20 wherein the ADB command is passed through the bus interconnect circuit to the selected destination device and the ADB command is interpreted in the selected destination device as a data synchronization barrier (DSB) command.

24. The method of claim 20, wherein the device directed memory barrier command is encoded as a segment directed memory barrier (SDB) command that enables the bus interconnect circuit to interpret the identification attribute as having a first section and a second section.

25. The method of claim 24, wherein the first section specifies a bit for each destination device on a first level interconnect of the multilevel interconnect hierarchy of destination devices and the second section specifies a bit for each destination device on a second level interconnect of the multilevel interconnect hierarchy of destination devices, wherein an asserted bit in one of the two sections specifies the selected destination device.

26. The method of claim 24 wherein the SDB command is passed through the bus interconnect circuit to the selected destination device and the SDB command is interpreted in each the destination device receiving the SDB command as a data synchronization barrier (DSB) command.

27. The method of claim 20, wherein the device directed memory barrier command uses a first encoding to identify the device directed memory barrier command as a data synchronization barrier (DSB) command, a second encoding that is a subset of the first encoding to identify the DSB command as an address directed barrier (ADB) command, and a third encoding that is a subset of the first encoding to identify the DSB command as a segment directed barrier (SDB) command.

28. The method of claim 27, wherein the selected destination device interprets the ADB command as the DSB command.

29. The method of claim 27, wherein each of the selected destination device interprets the SDB command as the DSB command.

30. The method of claim 20, wherein the bus interconnect circuit is coupled to destination devices at a first level interconnect of the multilevel interconnect hierarchy of destination devices including a second bus interconnect circuit that is coupled to destination devices at a second level interconnect of the multilevel interconnect hierarchy of destination devices.

31. The method of claim 20, wherein the device directed memory barrier command is interpreted as a data synchronization barrier (DSB) command to create a barrier and also force context synchronization.

\* \* \* \* \*